United States Patent

[11] 3,596,113

| [72] | Inventor | Robert L. Seidler<br>6 Plymouth Road, Summit, N.J. 07901 |
|---|---|---|
| [21] | Appl. No. | 813,681 |
| [22] | Filed | Apr. 4, 1969 |
| [45] | Patented | July 27, 1971 |

[54] PULSE GENERATING AND TIMING CIRCUIT FOR PROVIDING ACCURATELY TIMED REPETITION OF SEQUENCE OF PULSES
9 Claims, 5 Drawing Figs.

[52] U.S. Cl. ................................................. 307/265, 307/269, 307/293, 328/58, 328/130
[51] Int. Cl. ................................................. H03k 1/18
[50] Field of Search ................................................. 307/260, 265, 293; 328/58, 129—131, 72—75

[56] References Cited
UNITED STATES PATENTS
3,492,593  1/1970  Ullmann et al. ............... 307/265 X
3,493,790  2/1970  Lundin ........................ 307/293

*Primary Examiner*—Stanley D. Miller, Jr.
*Attorney*—Bryan, Parmelee, Johnson & Bollinger

ABSTRACT: A pulse generating and timing circuit which can be employed in applications requiring reliable, accurately timed, pulses, such as for producing a predetermined signal sequence desirable for use in aids to navigation such as marine signal buoys and beacons and a method of timing same in manufacture, providing stable accurate repetition of the desired signal sequence in spite of changes in ambient conditions over wide ranges. Ratios of the time durations between the respective pulses producing the lengths of the respective signals of the sequence can be accurately predetermined and thereafter the method of adjusting the value of one resistor combination can simultaneously and proportionately adjust the time durations of all signals in the sequence, thus substantially reducing production time and labor and the number of different inventoried resistors required for production.

INVENTOR.
Robert L. Seidler

INVENTOR.
Robert L. Seidler

PULSE GENERATING AND TIMING CIRCUIT FOR PROVIDING ACCURATELY TIMED REPETITION OF SEQUENCE OF PULSES

BACKGROUND OF THE INVENTION

In many applications there is a requirement for accurately timed and reliable pulses. For example, in signal devices which are used as aids to navigation it is extremely important that the signal timing characteristics remain stable and accurately repetitive during operation over long periods of time. This requirement for stable and repetitive timing characteristics is necessitated by the fact that navigators and pilots utilize and rely upon the different characteristics of the respective signal devices. They identify them and distinguish between them for accurately determining the location of the ship often under adverse weather conditions where factors of safety are involved. Such signal devices are typically used in marine buoy and beacon applications wherein wide variations in ambient conditions are encountered. In spite of these changing ambient conditions the flashing light characteristics, i.e. the particular sequence of flashes and eclipses must remain stable over long periods of time.

Also it is important that the cost of such signal devices be reasonable because relatively large numbers of buoys and beacons are employed along the coastlines and in harbors, rivers, channels, etc. In addition, it is highly desirable that such signal devices avoid the use of make-and-break contacts and other moving parts.

DESCRIPTION

The present invention relates to an accurate, reliable pulse-generating and timing circuit adapted to produce voltage pulses suitable for use in many applications such as controlling time cycles of operation of radio beacons, navigation equipment, railway signals, flashing lights on aircraft or other locations, in signs or displays, and for controlling time cycles in medical and scientific appliances or in household appliances, such as washing machines having multiple functions. The illustrative embodiment is shown for actuating an electrical load, such as signal lights, at accurate repetition rates and with stable operating characteristics over long periods of time. Also, this invention relates to the production method of accurately timing the sequence.

It is among the advantages of the pulse generating and timing circuit of the present invention that it is compensated so that it produces a stable and accurate repetition of the desired sequence of voltage pulses in spite of variations in ambient conditions, including wide variations in temperature and including violent mechanical agitation, such as occurs in marine buoys during a storm at sea.

Additional advantages of the circuit of the present invention result from the fact that the ratios of the time durations of the respective pulses can be accurately determined by the relative values of a first group of predetermined resistors while time durations of these pulses are determined by the value of another resistor combination. It enables an advantageous method of manufacture to be employed. Once the ratios of the predetermined resistors of the first group have been established for manufacturing a particular sequence of flashes and eclipses, it is then convenient and easy to trim the value of the resistor combination to establish the exact time for each flash and eclipse in the sequence. Moreover, the production operator is saved the time delay of waiting through sequence after sequence while trimming the resistor combination. The operator merely varies the trimming resistor until the shortest flash of the sequence reaches its desired value. By virtue of the fact that the ratios of all of the time durations of the sequence has been predetermined, it follows that when the time duration of the shortest flash has been adjusted to the desired value, then all other time durations of the sequence have correspondingly become properly adjusted.

Additional features, aspects and advantages of the present invention will become more fully understood from a consideration of the following detailed description of a presently preferred embodiment of the invention. In the drawings.

Figure 1:
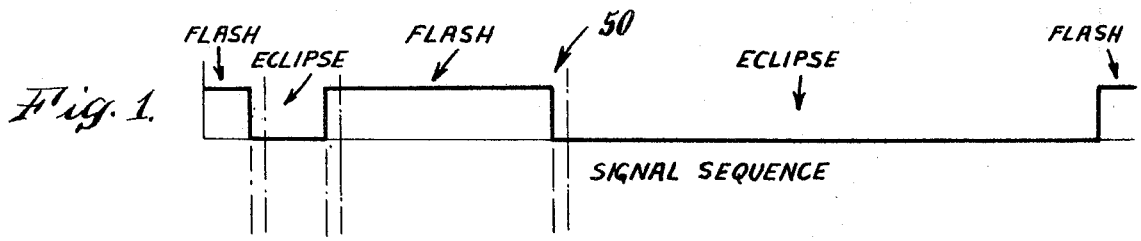
FIG. 1 is a plot of a typical marine buoy sequence, including a short flash (0.4 seconds) a short eclipse (0.6 seconds), a long flash (2.0 seconds), and a final long eclipse (5.0 seconds).
Figure 2:
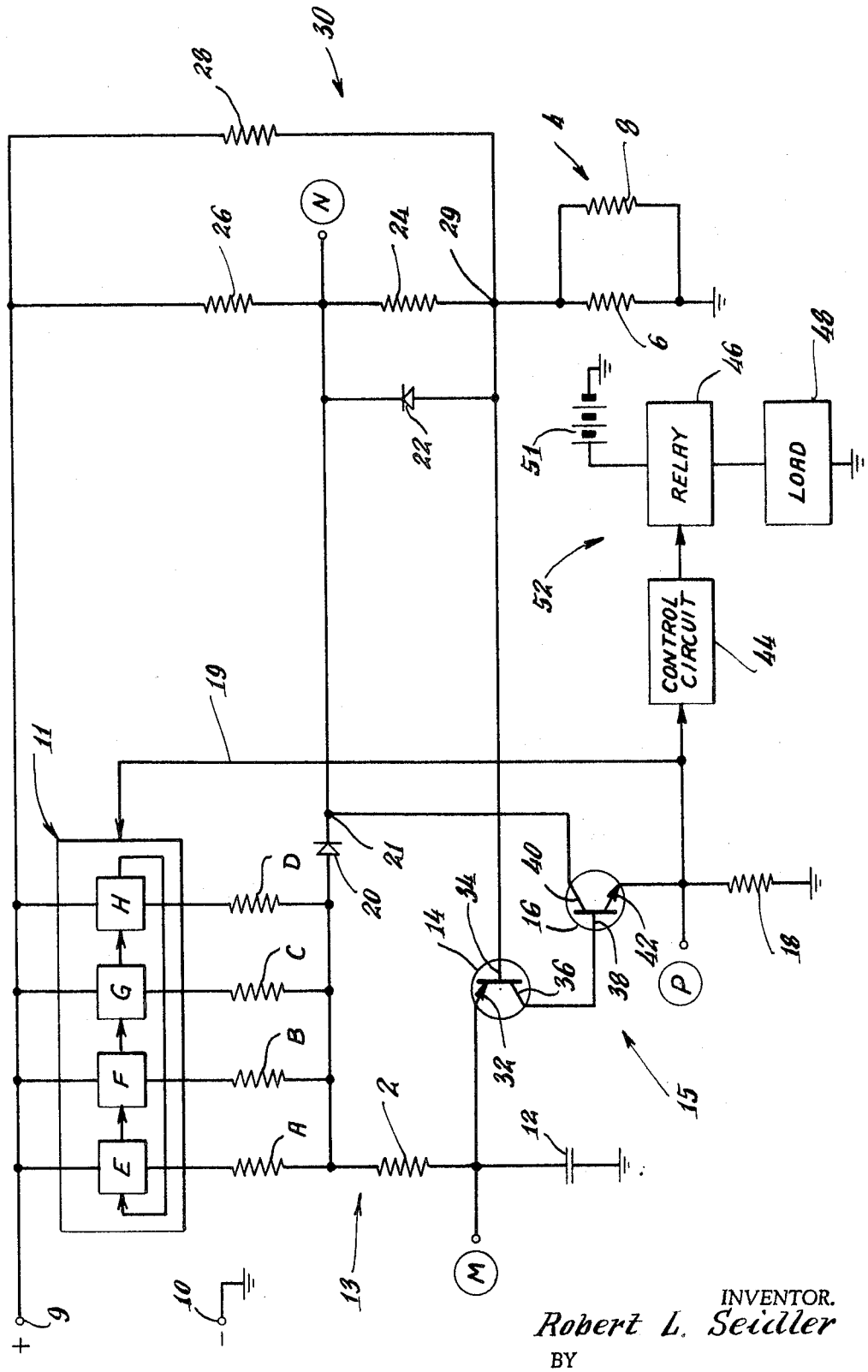
FIG. 2 is a schematic diagram of a pulse generating and timing circuit embodying the invention and illustrating the method of accurately timing.

Referring to the drawings in greater detail, FIG. 2 shows a pulse generating and timing circuit for producing a predetermined sequence of signals, such as flashes and eclipses, like the signal sequence shown in FIG. 1. In this circuit the ratio of the time duration of each of the respective flashes and eclipses is advantageously determined by the predetermined group of resistors A, B, C, D, and including the resistor 2.

For example, if the resistance values of the resistors A, B, C, D and 2 are, respectively $R_A$, $R_B$, $R_C$, $R_D$, and $R_2$, the ratio $K_1$ between the time duration of the first and second signals of the sequence, i.e. between the first flash and first eclipse is determined as follows:

1. $R_A + R_2 = W$
2. $R_B + R_2 = X$
3. $K_1 = W/X$

Similarly, the ratio $K_2$ between the time duration of the second and third signals of the sequence, i.e. between the first eclipse and the second flash is determined as follows:

2. $R_B + R_2 = x$
4. $R_C + R_2 = Y$
5. $K_2 = X/Y$

Likewise, the ratio $K_3$ between the time duration of the third and fourth signals of the sequence, i.e. between the second flash and the second eclipse is determined as follows:

4. $R_C + R_2 = Y$
6. $R_D + R_2 = Z$
7. $K_3 = Y/Z$

The present invention provides a very advantageous method of obtaining the desired length of each signal of the sequence. This method markedly reduces the length of time required to manufacture and adjust the circuit and hence substantially reduces costs to the users of the equipment.

The absolute length of each flash and eclipse is controlled and adjusted by trimming the effective resistance value of a resistor combination generally indicated at 4. This resistor combination 4 includes a predetermined resistor 6 shunted by a trimming resistor 8. When this resistor combination 4 has been adjusted to the proper value to cause the actual time duration of the first signal flash to be the desired value of 0.4 seconds, then it follows that the other flash and the eclipses will all also have their correct respective time durations.

The source of direct current, which is usually a battery, is connected across the terminals 9 and 10, with the negative side of the source applied to the common return or "grounded" terminal 10. The positive terminal 9 is connected by switch means, generally indicated at 11, to a capacitor-charging circuit, generally indicated at 13. The switch means 11 serves the function of connecting individually and in predetermined sequence respective ones of the first resistors A, B, C or D into the capacitor-charging circuit 13. This switch means 11 may comprise any of a variety of flip-flop switching circuits such as are known for progressively switching from one of the resistors A, B, C or D to the next in accordance with a predetermined sequence. In this embodiment the switch means 11 is shown as a ring counting circuit including a plurality of switching elements E, F, G and H associated with the respective resistors A, B, C and D. Accordingly, one of the first resistors A or B or C or D is included together with the second resistor 2 in the capacitor-charging circuit 13; so that the capacitor 12 is charged by current flowing through the first resistor A, B, C or D and the second resistor 2.

As will be explained in detail further below accurately timed pulses are generated at the point P (FIG. 2), and these pulses are fed through a lead 19 to the switch means 11 to actuate the respective switching elements E, F, G and H in sequence. The switching elements E, F, G and H are connected in circuit between the positive terminal 9 and the respective resistors A, B, C and D. The other ends of each of the resistors A, B, C and D are connected to the resistor 2 which in turn is connected to the capacitor 12 which is being charged. Its opposite side is connected through the common ground return to the terminal 10.

Figure 3:
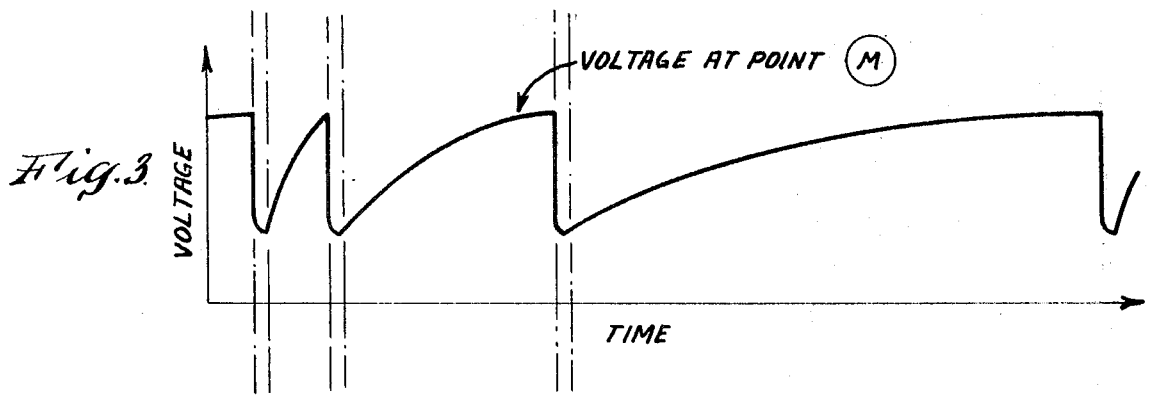
FIGS. 3, 4 and 5 are plots of the voltages appearing at three points M, N and P in the circuit of FIG. 2.
Figure 4:
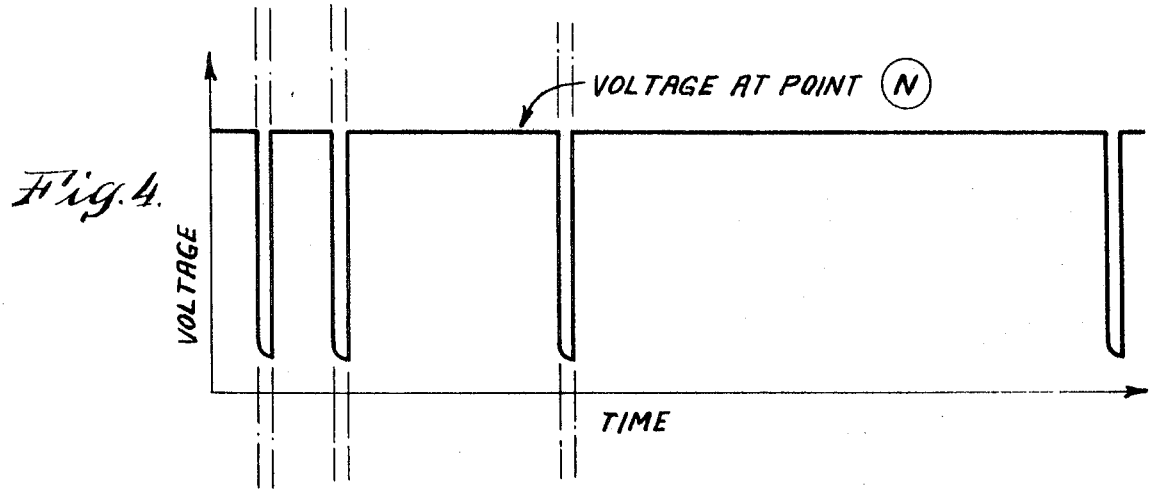

The interconnection point between the second resistor 2 and capacitor 12 is the point M at which the voltage curve shown in FIG. 3 is generated. This point M is connected to a voltage comparator and trigger circuit 15. This voltage comparator and trigger circuit 15 is responsive to the voltage at point M and also is responsive to the voltage at a voltage-divider point 29 to be described in detail further below, and thus the circuit 15 is actuated by the comparative level of the voltage at points M and 29. When the voltage at point M rises to a level corresponding with the voltage at the point 29, then the circuit 15 is triggered and a pulse is generated.

Figure 5:
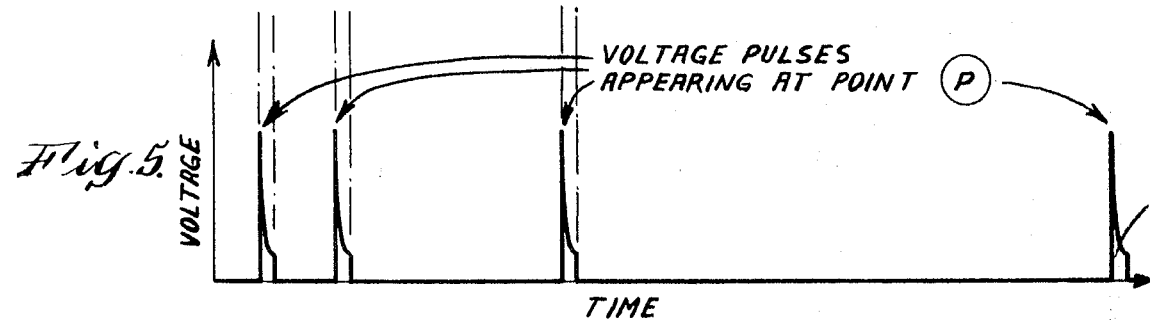

The voltage comparator and trigger circuit 15 includes a first transistor 14 having its emitter connected to point M and having its collector connected to the base electrode of an NPN transistor 16. The emitter of this transistor 16 is returned to the terminal 10 through a voltage pulse-forming resistor 18. The voltage pulses shown in FIG. 5 appear at the point P at the connection between the emitter of the transistor 16 and the resistor 18.

The other ends of the group of resistors A, B, C and D are in circuit as traced through a diode rectifier 20 and a connection 21 to the collector electrode of the transistor 16.

The base electrode of the transistor 14 is connected through a diode rectifier 22 to the connection point 21. In parallel with this diode 22 is a resistor 24, while a resistor 26 is connected in circuit from the positive source terminal 9 to the common connection point 21. A resistor 28 is shunted across the resistors 24 and 26 in series. The resistor network 26, 24 and 28 together with the combination 4 comprise a voltage-divider network, generally indicated at 30.

The functions and features of this pulse generating and timing circuit will become more fully understood from the following description of its operation.

The voltage comparator and trigger circuit 15 becomes triggered when the voltage at point M has risen to a level corresponding to the voltage of point 29 in the voltage divider network 30, then the circuit 15 is triggered into full conduction providing an accurately timed voltage pulse at the point P.

The ratios of the time durations of the respective signals of the sequence is determined by the values of the resistors in the capacitor-charging circuit 13. The actual time duration of each signal is determined by the values of the resistors in the voltage-divider network 30.

This operation will now be explained in further detail. Assuming that the capacitor 12 is initially in a discharged state, the base electrode of the transistor 14 is held at a potential determined by a connection point 29 in the voltage-divider network 30. As mentioned above, this voltage divider network 30 comprises the series and parallel resistors 26, 24 and 28 which are in circuit between the positive terminal and the voltage-divider point 29 together with the parallel resistor combination 4 which is in circuit between the connection point 29 and the negative terminal 10.

At this initial time the transistors 14 and 16 are in the nonconducting state. Also the diodes 20 and 22 are reversed biased and thus are nonconducting.

Also, it is assumed that the switch E is conducting while the other switches F, G and H are nonconducting. As the capacitor 12 charges through the resistors A and 2, the potential applied to the emitter electrode 32 of the transistor 14 rises. When the voltage of the emitter 32 has risen to a level exceeding the voltage of the base electrode 34 of this transistor 14, then this transistor begins to conduct.

As soon as the transistor 14 begins to conduct, a current flow path is established from the collector 36 to the base 38 of the transistor 16, causing this transistor 16 to begin conducting. As transistor 16 begins conducting, its collector electrode 40 draws current from the connection point 21, thus lowering the voltage at the junction N between the resistors 26 and 24.

Accordingly, the potential of the voltage-divider point 29 is reduced somewhat by the reduction in voltage at the point N.

This reduction in voltage at point 29 results in a reduction of the voltage of the base 34, producing a corresponding increase in the forward bias of the emitter 32, thus further increasing the current flowing to the base 38, and so forth. These interactions can be summarized as a regenerative action which abruptly increases the conduction through the emitter-collector circuit 32—36.

The capacitor 12 then discharges through the transistor 14. There are multiple discharge paths: through the emitter-base path 32—34 passing on through diode 22 and through the collector-emitter path 40—42 of transistor 16 and resistor 18, and also through the emitter-collector path 32—36 passing on through the base-emitter path 38—42 and through resistor 18.

The sudden surge of current through resistor 18 generates a voltage pulse (FIG. 5) at the point P. This point P is connected to the respective flip-flop switches E, F, G and H to actuate them in sequence. Accordingly, the switch E is rendered nonconducting, thus ending the first signal of the sequence shown in FIG. 1. At the same time the switch F is rendered conducting.

After capacitor 12 discharges, the potential of emitter 32 approaches the potential of base 34, which latter potential is determined by a voltage-divider network comprising resistor 28 in series with conducting diode 22, the collector-emitter flow path 40—42, and the resistor 18. Accordingly, the transistor 14 begins to decrease conduction, i.e. to turnoff, thus causing a regenerative turnoff of both transistors 14 and 16.

The diode 20 causes the potential at the junction of resistors A and 2 to be held at a low value during the time that transistors 14 and 16 are conducting, thereby preventing a locked conduction condition, i.e. a locked "on" condition for the transistor 14 and thus also preventing a locked on condition of the transistor 16, particularly for short timing signal sequences in which the charging resistor 2 has a relatively low value.

As soon as the regenerative shutoff of the transistors 14 and 16 has occurred the next charging sequence begins. By virtue of the fact that the switch F is conducting, the charging path is now through the resistor B in series with resistor 2, thus producing the time duration of the second signal in the signal sequence 50 shown in FIG. 1.

The resistors utilized are very stable type resistors such as metal glaze or film resistors. In manufacture the resistor 6 is purposely chosen to be somewhat too large in value. The operator experimentally determines the value of the shunt resistor 8 by utilizing the method as described above in which the actual time of the shortest flash signal of the sequence is observed.

The resistor 28 serves the function of assuring that the discharge time is always substantially the same without significant variation in spite of changes in ambient temperature or voltage of the source at terminals 9 and 10, and thus assures that the pulse duration (FIG. 5) is practically always the same to assure accurate timing.

By virtue of the fact that the ratios can be accurately predetermined, resistors of standard known values can be utilized and thus can be ordered in large quantities before commencing manufacture. These accurate-value metal film or glaze resistors are relatively expensive. Accordingly, the ability to order them in large quantities and at standard values with a substantial lead time before beginning production produces a great saving in costs of materials in inventory and labor with consequent substantial savings in ultimate cost to the user. In order to utilize the accurately timed pulses being generated at the point P, a utilization circuit 52 is connected to this point.

This utilization circuit may be any one of a large variety of circuits adapted to be controlled by such pulses as indicated above in the opening paragraphs, for example such as in radio beacons, navigation equipment, railway signals, flashing lights on aircraft or other locations, in signs or displays or for controlling time cycles in medical and scientific appliances or in household appliances such as washing machines having multiple functions. In this illustrative example, the utilization circuit 52 includes an initial control circuit 44, which may comprise an on-off flip-flop type switching circuit controlling an electronic relay circuit 46 for energizing an electrical load 48, such as a signal lamp, from a suitable source of current 51. A first pulse appearing at point P turns on the lamp 48 to begin the initial flash shown in FIG. 1. A second pulse at point P turns off the lamp to begin the eclipse signal. A third pulse at point P turns on the lamp to begin a second longer flash as shown in FIG. 1, while the fourth pulse at P turns off the lamp 48 to begin a second longer eclipse signal. Then the sequence repeats.

The terms and expressions which I have employed are used in a descriptive and not a limiting sense, and I have no intention of excluding equivalents of the invention described and claimed.

What I claim is:

1. A pulse generating and timing circuit for producing a predetermined signal sequence desirable for use in aids to navigation comprising: a positive and a negative terminal adapted to be connected to a source of direct current; a capacitor charging circuit extending between said terminals; said capacitor charging circuit including a plurality of first resistors, a plurality of switches for selectively connecting a respective one of the first resistors to the positive terminal, a second resistor connected to the opposite ends of said first resistors from said switches, and a capacitor in circuit between said second resistor and said negative terminal; a common connection point; first and second diodes; and a pulse-forming resistor; a point in said capacitor charging circuit intermediate said first and second resistors being connected in the forward direction through said first diode to said common connection point; a first transistor having first emitter, collector and base electrodes; a second transistor of NPN type having second emitter, collector, and base electrodes; said first emitter electrode being connected to said capacitor charging circuit intermediate said capacitor and said second resistor; said first base electrode being connected through said second diode in the forward direction to said common connection point, said first collector electrode being connected to said second base electrode, said second collector electrode being connected to said common connection point, and said second emitter electrode being connected through said pulse-forming resistor to said negative terminal; and a voltage-divider network extending between said positive and negative terminals, said voltage divider network including third, fourth and fifth resistors in series, said third resistor extending from said positive terminal to said common connection point, said fourth resistor shunting said second diode, and said fifth resistor extending from said first base electrode to said negative terminal.

2. A pulse generating and timing circuit for producing a predetermined signal sequence desirable for use in aids to navigation as claimed in Claim 1 in which the voltage pulses appearing across said pulse-forming resistor serve to actuate said switches in sequence for selectively connecting said first resistors individually into said capacitor charging circuit in sequence corresponding to said signal sequence.

3. A pulse generating and timing circuit for producing a predetermined signal sequence desirable for use in aids to navigation as claimed in Claim 2 in which the ratio K between the time duration of successive signals of said signal sequence is determined by the sum of the resistances of said second resistor and one of said first resistors divided by the sum of the resistances of said second resistor and the successive one of said first resistors connected into said capacitor charging circuit.

4. A pulse generating and timing circuit for producing a predetermined signal sequence desirable for use in aids to navigation as claimed in Claim 3 including a padding resistor shunting said fifth resistor for adjusting the time duration of the successive signals.

5. A pulse generating and timing circuit for producing a predetermined signal sequence desirable for use in aids to navigation as claimed in Claim 3 including a stabilizing resistor connected from said first base electrode to said positive terminal for stabilizing the time duration of the signals in spite of changes in ambient conditions and in spite of fluctuations in the voltage of the source of current applied to said terminals.

6. A pulse generating and timing circuit for producing a predetermined signal sequence desirable for use in aids to navigation comprising: a positive and a negative terminal adapted to be connected to a source of direct current; a capacitor charging circuit extending between said terminals; said capacitor charging circuit including a plurality of first resistors, a plurality of switches for selectively connecting a respective one of the first resistors to the positive terminal, a second resistor connected to the opposite ends of said first resistors from said switches, and a capacitor in circuit between said second resistor and said negative terminal; a voltage divider network extending between said positive and negative terminal including a common connection point and a voltage-divider point intermediate the ends of said voltage divider network, said common connection point being in circuit nearer said positive terminal than said voltage-divider point; a first diode connected in the forward direction from a point in said capacitor charging network intermediate said first and second resistors to said common connection point; a second diode connected in the forward direction from said voltage-divider point to said common connection point; a pulse-forming resistor connected to said negative terminal; a first transistor having its emitter-to-base current flow path in circuit form a point in said capacitor charging circuit intermediate said capacitor and said second resistor to said voltage divider point, a second transistor of the NPN type having its collector to emitter current flow path in circuit between said common connection point and said pulse-forming resistor, and a connection from the collector electrode of the first transistor to the base electrode of said second transistor.

7. A pulse generating and timing circuit for producing a predetermined signal sequence desirable for use in aids to navigation as claimed in claim 7 in which a padding resistor is shunted across the portion of said voltage divider network from said voltage-divider point to said negative terminal for adjusting the time duration of the signals of said sequence.

8. A pulse generating and timing circuit for producing a sequence of accurately timed pulses adapted to be employed in applications requiring reliable, accurately-timed pulses comprising a pair of terminals adapted to be connected to a source of direct current; a capacitor-charging circuit connected between said terminals; said capacitor-charging circuit including a capacitor to be charged and resistance means in circuit in series with the capacitor for controlling the rate at which said capacitor is charged; said capacitor-charging circuit including a point (M) in circuit intermediate said capacitor and resistance means; a voltage-divider network connected between said terminals; said voltage-divider network including a plurality of resistors; said voltage-divider network including a voltage-divider point (29) in circuit intermediate said resistors; a voltage-comparator and trigger circuit (15) connected between said capacitor-charging point (M) and said voltage-divider point (29); said voltage-comparator and trigger circuit including a pulse-forming resistor and a first transistor having its emitter-to-base current flow path in circuit from said capacitor-charging point (M) to said voltage-divider point (29), a second transistor of the NPN type having its collector-to-emitter current flow path in circuit from said resistance means in said capacitor-charging circuit to said pulse-forming resistor, and a connection from the collector electrode of the first transistor to the base electrode of said second transistor for suddenly discharging said capacitor through said resistor when the voltage of point (M) rises to a level above point (29) for generating voltage pulses across said resistor; and an output connection to said pulse-forming resistor for controlling a utilization circuit, by virtue of all of which the relative rate of charging of said capacitor is controlled by said resistance means in said capacitor-charging circuit and the actual time duration between pulses is controlled by said voltage-divider network.

9. A pulse generating and timing circuit for producing a sequence of accurately timed pulses adapted to be employed in applications requiring reliable, accurately-timed pulses comprising a pair of terminals adapted to be connected to a source of direct current; a capacitor-charging circuit connected between said terminals; said capacitor-charging circuit including a capacitor to be charged and resistance means in circuit in series with the capacitor for controlling the rate at which said capacitor is charged; said resistance means including a plurality of resistors; a plurality of switching elements connected to said resistors for selectively connecting said resistors into said capacitor-charging circuit for changing the rate at which said capacitor is charged; said capacitor-charging circuit including a point (M) in circuit intermediate said capacitor and resistance means; a voltage-divider network connected between said terminals; said voltage-divider network including a plurality of resistors; said voltage-divider network including a voltage-divider point (29) in circuit intermediate said resistors; a voltage-comparator and trigger circuit connected between said capacitor-charging point (M) and said voltage-divider point (29); said voltage-comparator and trigger circuit including a pulse-forming resistor for suddenly discharging said capacitor through said resistor when the voltage of point (M) rises to a level above point (29) for generating voltage pulses across said resistor; and an output connection to said pulse-forming resistor for controlling a utilization circuit, by virtue of all of which the relative rate of charging of said capacitor is controlled by said resistance means in said capacitor-charging circuit and the actual time duration between pulses is controlled by said voltage-divider network; and a connection from said pulse-forming resistor to said switching elements for selectively actuating them in response to the pulse generated.